United States Patent
Thirlaway et al.

(10) Patent No.: US 9,789,761 B2
(45) Date of Patent: Oct. 17, 2017

(54) SUPPORT ARM ASSEMBLY

(75) Inventors: George Thirlaway, Coventry (GB); Steve Checkley, Coventry (GB); Adam Grant, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 72 days.

(21) Appl. No.: 14/238,764

(22) PCT Filed: Aug. 17, 2012

(86) PCT No.: PCT/EP2012/003501
§ 371 (c)(1),
(2), (4) Date: Feb. 13, 2014

(87) PCT Pub. No.: WO2013/023790
PCT Pub. Date: Feb. 21, 2013

(65) Prior Publication Data
US 2014/0209194 A1    Jul. 31, 2014

(30) Foreign Application Priority Data

Aug. 17, 2011 (GB) .................................. 1114125.6
Aug. 17, 2011 (GB) .................................. 1114127.2
Aug. 17, 2011 (GB) .................................. 1114129.8

(51) Int. Cl.
*B60K 15/077* (2006.01)
*B60K 15/03* (2006.01)

(52) U.S. Cl.
CPC ............ *B60K 15/077* (2013.01); *B60K 15/03* (2013.01); *Y10T 137/86348* (2015.04); *Y10T 137/8807* (2015.04)

(58) Field of Classification Search
CPC ..... F02M 37/103; F02M 39/005; B29C 49/20
(Continued)

(56) References Cited

U.S. PATENT DOCUMENTS 3,884,255 A * 5/1975 Merkle ......................... 137/265
4,790,185 A * 12/1988 Fedelem ................. G01F 23/30
137/565.24

(Continued)

FOREIGN PATENT DOCUMENTS

FR   WO 2009125008 A1 * 10/2009 ........... B60K 15/077
GB            1144811           7/1966
(Continued)

OTHER PUBLICATIONS

International Search Report for PCT International Application No. PCT/EP2012/003501 mailed Nov. 20, 2012.
(Continued)

*Primary Examiner* — Jessica Cahill
*Assistant Examiner* — Angelisa L Hicks
(74) *Attorney, Agent, or Firm* — Carlson, Gaskey & Olds

(57) ABSTRACT

The present invention relates to a support arm assembly (39) for mounting in a fuel tank (1). The support arm assembly (39) comprises an arm (43) having a connector (51) for mounting the support arm assembly (39). A fuel fill limiter is mounted on the arm (43). The support arm assembly (43) can be installed in a fuel tank (1) through an access aperture (A) and mounted within the fuel tank (1). The present invention also relates to a fuel tank (1) in combination with the support arm assembly (43).

22 Claims, 9 Drawing Sheets

(58) Field of Classification Search
USPC .......................................... 137/565.17, 587
See application file for complete search history.

(56) References Cited

U.S. PATENT DOCUMENTS

| | | | |
|---|---|---|---|
| 5,040,516 A * | 8/1991 | Haraguchi | 123/509 |
| 6,298,540 B1 * | 10/2001 | Benjey et al. | 29/452 |
| 6,474,374 B1 | 11/2002 | Kleppner | |
| 6,966,305 B2 * | 11/2005 | Aubree et al. | 123/509 |
| 7,455,190 B2 | 11/2008 | Potter et al. | |
| 2007/0094755 A1 | 4/2007 | Jeon | |
| 2008/0149199 A1 * | 6/2008 | Bleuel | 137/565.01 |
| 2008/0302339 A1 * | 12/2008 | Krogull et al. | 123/516 |
| 2010/0116366 A1 | 5/2010 | Gattozzi et al. | |

FOREIGN PATENT DOCUMENTS

| | | |
|---|---|---|
| GB | 1286397 | 8/1972 |
| GB | 2428415 A | 1/2007 |
| GB | 2434347 A | 7/2007 |
| JP | 2010-076526 | 4/2010 |
| JP | 2010070097 A | 4/2010 |
| JP | 2010112495 A | 5/2010 |
| WO | 0047437 | 8/2000 |
| WO | 2007149294 A1 | 12/2007 |
| WO | 2009125008 A1 | 10/2009 |

OTHER PUBLICATIONS

Combined Search and Examination Report under Sections 17 and 18(3) for Application No. GB1114127.2 dated Dec. 16, 2011.
Examination Report under Section 18(3) for Application No. GB1114127.2 dated Mar. 19, 2013.

* cited by examiner

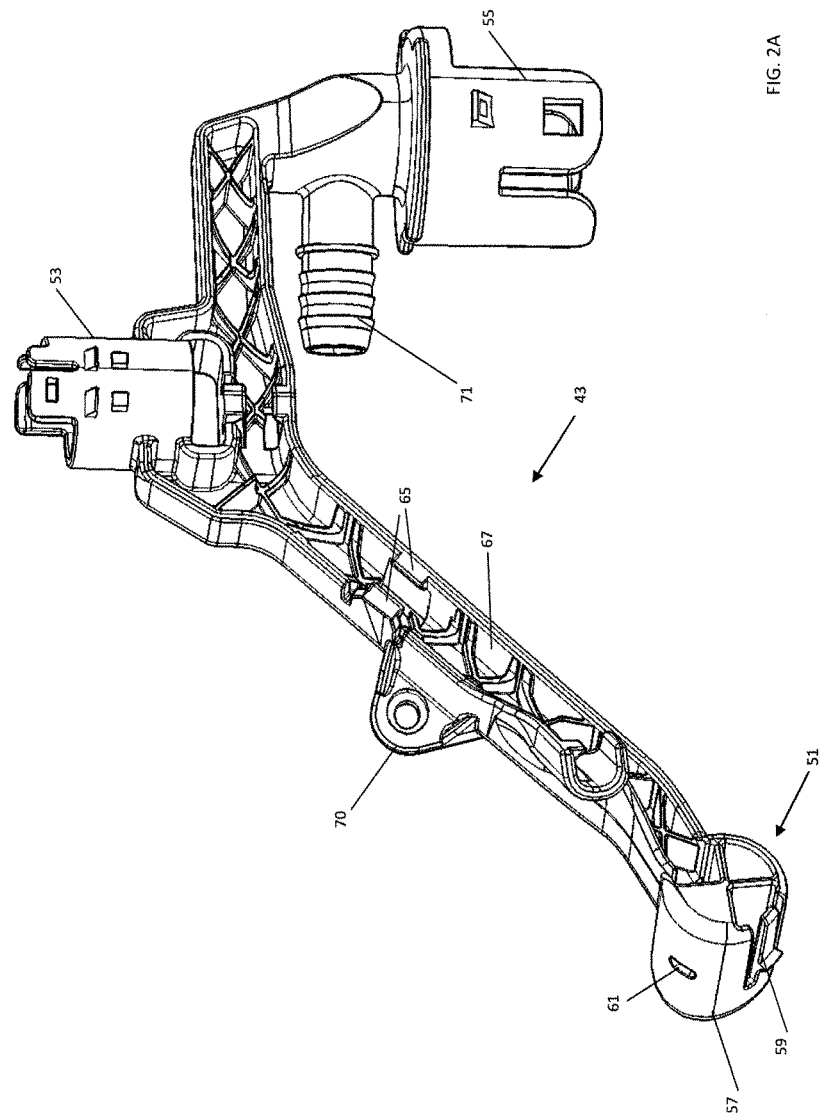

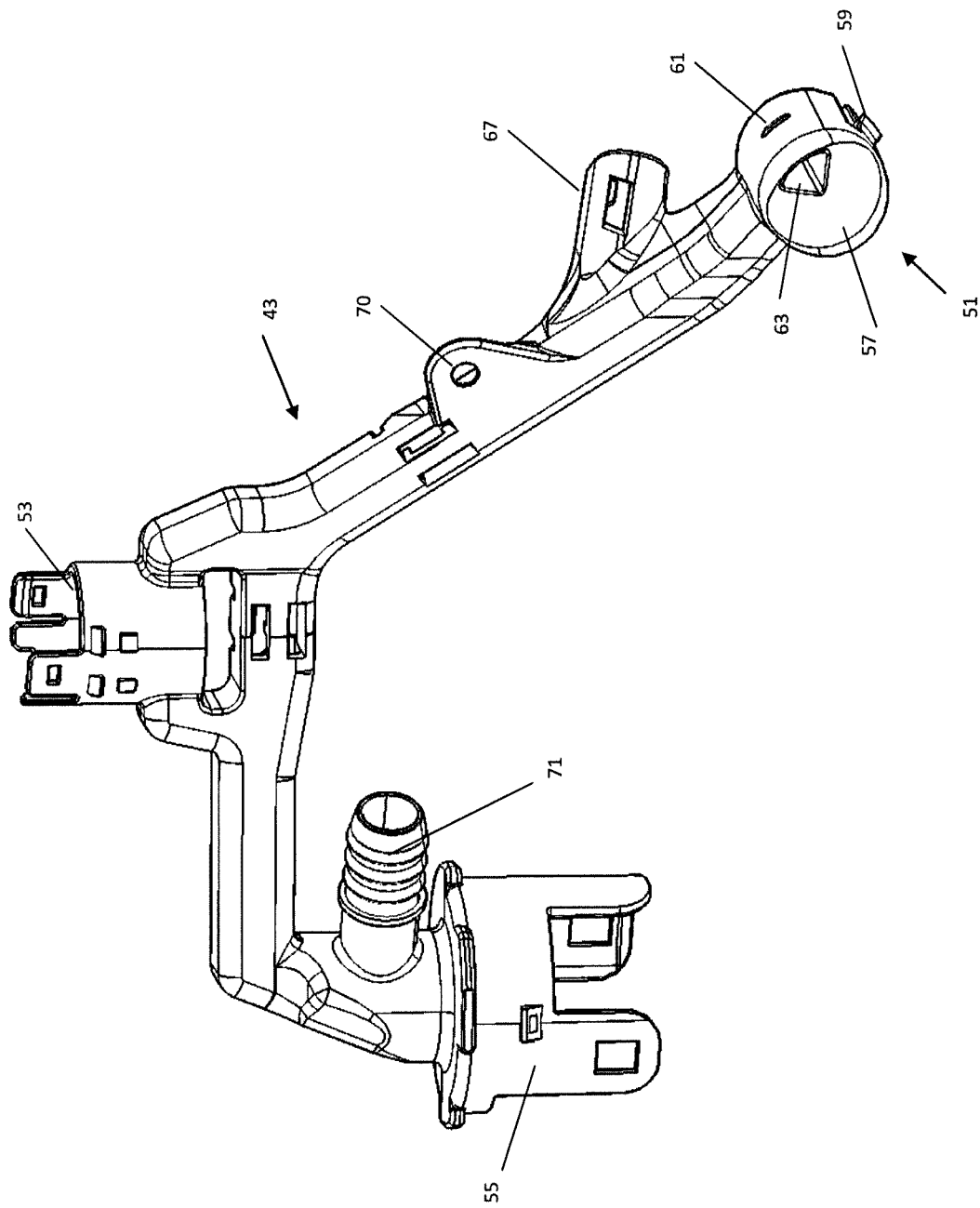

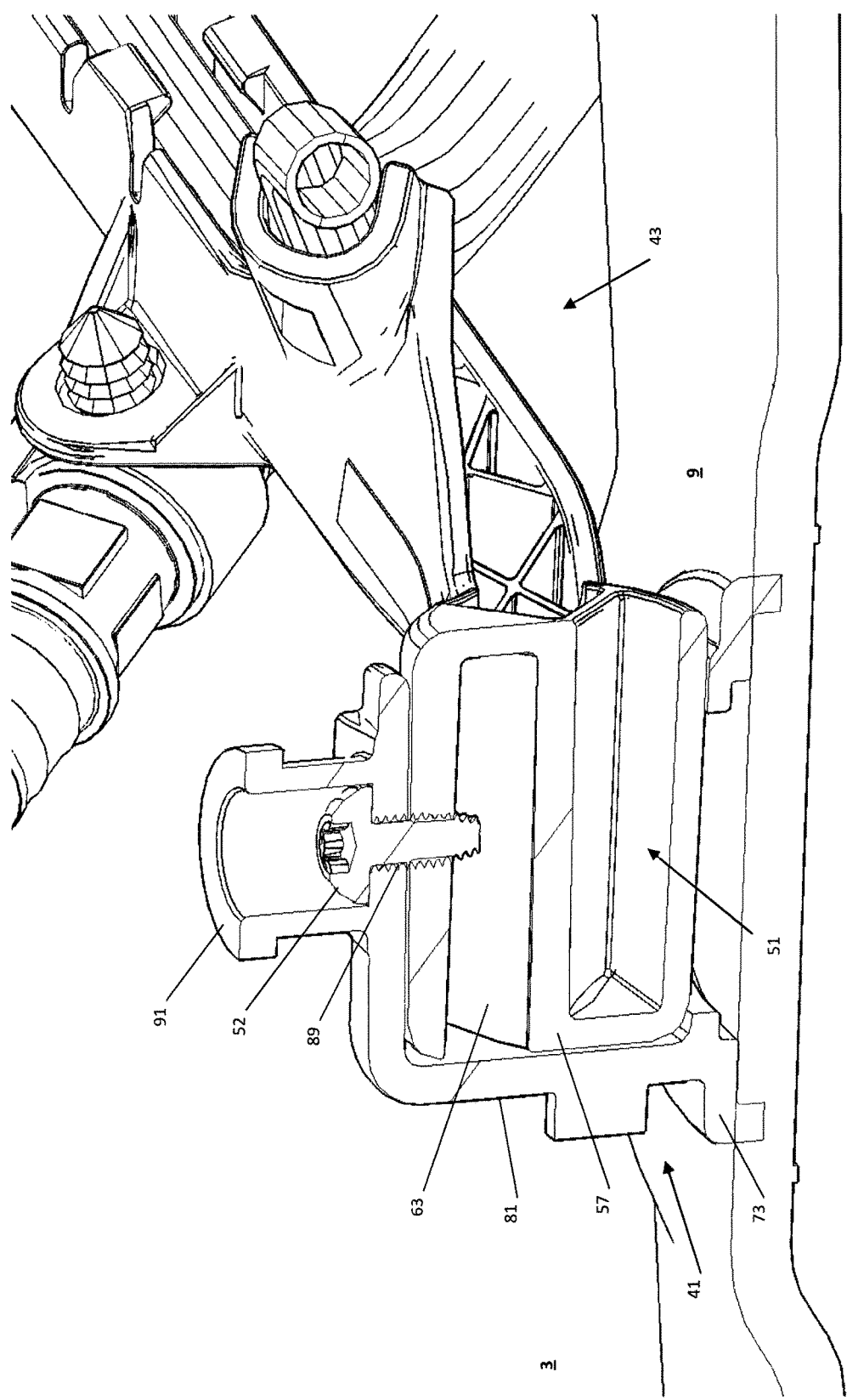

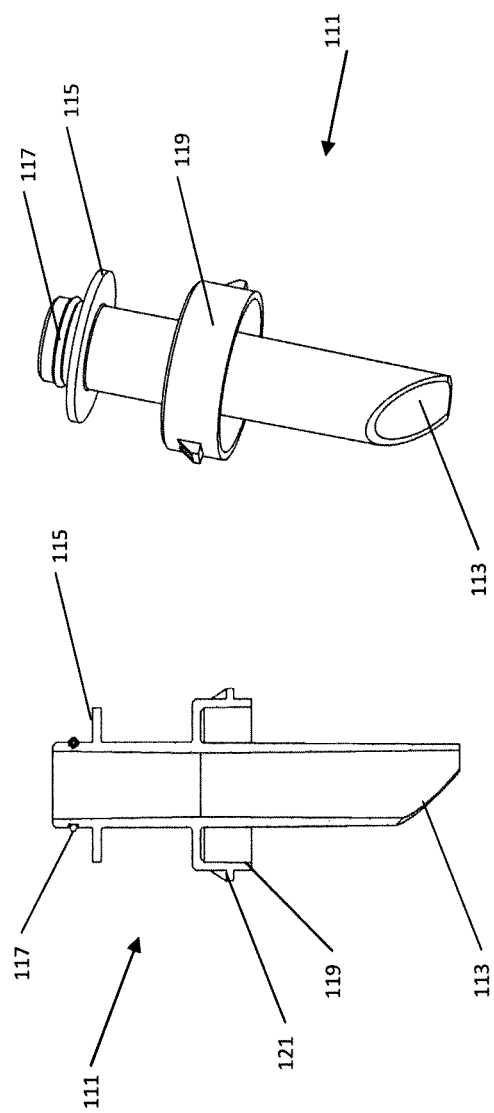

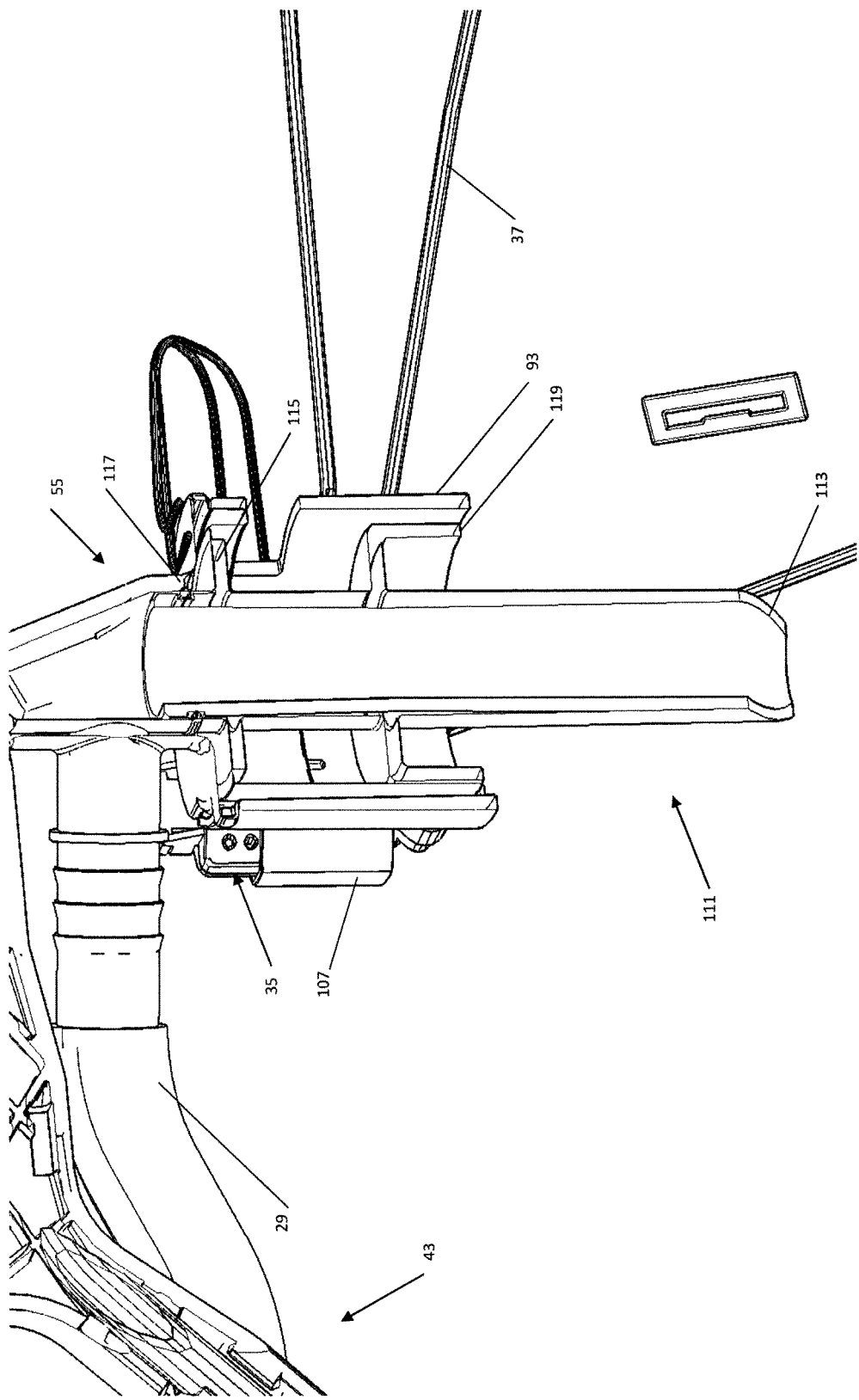

SUPPORT ARM ASSEMBLY

TECHNICAL FIELD

The present application relates to an apparatus for mounting functional components in a fuel tank. More particularly, but not exclusively, the present application relates to a support arm assembly for mounting in a fuel tank. The fuel tank is typically for use in a motor vehicle. Aspects of the invention relate to a support arm assembly, to a tank and to a vehicle.

BACKGROUND

It is known to form fuel tanks using an extrusion blow-moulding process. The fuel tanks are formed as a sealed moulding and access apertures are cut to allow the installation of functional components, such as fuel pumps, vents and fuel level senders. To reduce the potential emission of hydrocarbons from the fuel, it is desirable to reduce the number of access apertures formed in the fuel tank. However, this can make it difficult to install the required functional components within the fuel tank.

It is known from GB 2428415 to provide a moveable carrier on a suspension arm. A peg is molded into a sidewall of the fuel tank to support a distal end of the suspension arm. The carrier supports a fuel sender unit and is initially in an installation position to enable it to be introduced through the access aperture. The carrier is then pivoted to a deployed position by the mounting peg when the suspension arm is installed. A proximal end of the suspension arm is supported by a flange located in an access aperture.

Furthermore, U.S. 2008/0149199 discloses an articulated boom for positioning a fuel line in a saddle-type fuel tank. The boom has a spring-loaded mechanism which enables the boom to pivot from a first pressure-loaded position to a second pressure-loaded position by pulling on the fuel line. The proximal end of the boom is mounted on a swirl tank provided in the fuel tank. A retainer provided on the boom presses against the floor of the tank and a support member engages the roof of the tank to fix the boom in position.

A potential problem with these systems is the need to mount other functional components, such as a fill limiter and fuel level sender, within the fuel tank. One approach is to attach the functional components to a mounting flange positioned in the access aperture. For example, U.S. Pat. No. 7,520,293 discloses mounting a manifold in the access aperture to support a tentacle connected to a floating vent valve. Similarly, U.S. Pat. No. 6,298,540 discloses a fuel level sender unit mounted in the access aperture of a fuel tank. GB 2428415 discloses mounting a fuel tank venting device on the suspension arm. However, these approaches may apply increased loads to the mounting flange (directly or indirectly) and may reduce the efficacy of seals formed around the access aperture.

It is known to provide a fuel tank with a fill limiter to limit the amount of fuel that can be introduced into the fuel tank. The fuel fill limiter typically comprises a valve which selectively opens and closes a breather vent to allow air to vent from the fuel tank when fuel is being supplied. The valve is typically actuated by a float provided within the fuel tank and, when the level of the fuel in the fuel tank reaches a predetermined height, the valve closes the breather vent and seals the fuel tank. A venturi disposed within the fuel dispenser cuts off the supply of fuel in response to the resulting increase in pressure within the fuel tank.

It may be necessary to service or replace the fuel fill limiter valve. As the valve may be disposed within the fuel tank, this can involve at least partially dismantling the fuel tank.

SUMMARY

According to one aspect of the present invention there is provided a support arm assembly for mounting in a fuel tank, the support arm assembly comprising an arm having a connector for mounting the support arm assembly, and a fuel fill limiter mounted on the arm.

Since the fuel fill limiter is mounted on the arm, the steps required to assemble the fuel tank can be reduced. Moreover, it is possible to ascertain that the fuel fill limiter is correctly positioned when the support arm assembly is installed in the fuel tank.

The support arm assembly may comprise a fuel transfer tube for connection to a fuel pump.

In some embodiments, the support arm assembly can be installed in the fuel tank as a complete assembly. Moreover, the assembly may be introduced into the fuel tank and installed via a single access aperture. The support arm assembly according to the present invention may be mounted on the fuel tank remote from the access aperture, thereby potentially allowing the operational loads on the seals formed around the access aperture to be reduced. The support arm assembly may be operatively mounted on a sidewall of the fuel tank.

The fuel fill limiter can comprise a fuel fill limit vent valve. The provision of a fuel fill limit vent valve is appropriate when the fuel tank is to be used in a petrol system. The fuel fill limit vent valve provides a cut-off to prevent fuel entering a breather tube connected to a vapour canister (for example a charcoal canister).

A collar shroud can be provided around the fuel fill limiter. A guide member for a fuel transfer tube can extend from the collar shroud. The collar shroud can be formed integrally with the arm; or the collar shroud may be a formed separately and mounted on the arm.

If the support arm assembly is to be used in a diesel system, the fuel fill limit vent valve may not be required. To set the fuel fill height, the fill limiter may comprise a hollow member (i.e. a vessel) having an opening formed therein. The hollow member is placed in fluid communication with a breather tube and the opening places the breather tube in fluid communication with an interior of the fuel tank. During filling of the tank, the opening in the hollow member allows gases to vent from the fuel tank through the breather tube. However, when the level of the fuel rises above the opening in the hollow member, the opening is closed and gases can no longer vent from the fuel tank. The breather tube is closed by the fuel and the fuel tank is effectively sealed. The continued supply of fuel to the fuel tank thereby results in an increase of pressure in the fuel tank and this causes a fuel dispenser to cut off. The hollow member serves as a fuel limiter without the need to provide a movable member, such as a fuel fill limiter valve. The air in the hollow member subsequently vents to a fuel cap via the breather tube. The opening can be formed in a lower region of the hollow member, or in a base of the hollow member. The hollow member can be formed by a tube or conduit which is open at its lower end. The hollow member can be a tubular member where, in use, the tubular member extends substantially vertically within the fuel tank. The opening in the fuel fill limiter can be positioned below the breather vent in the fuel tank. This may help prevent fuel passing through the breather vent. The opening may be inclined relative to a longitudinal axis of the hollow member. The hollow member could be formed by the collar shroud or an extension thereof. A seal, such as an O-ring seal, may be provided to form a seal between the hollow member and a breather conduit.

The support arm assembly may be generally U-shaped. In use, the support arm assembly may be positioned so that the U-shape is inverted and extends over a saddle or a baffle plate provided in the fuel tank. The support arm assembly supports the fuel transfer tube in a U-shaped configuration. The support arm assembly could have a variable geometry. For example, the arm could be articulated. However, at least in some embodiments, the support arm assembly can have a fixed geometry (i.e. is not articulated).

The fuel transfer tube may be flexible, but the arm can be rigid or substantially inflexible. The cross over arm may be moulded from a plastics material.

The support arm assembly may also include a roll over vent valve. The roll over vent valve can be mounted on the arm. The roll over vent valve may be located at the top of the arm so as to be positioned at the top of the fuel tank when the support arm assembly is installed. The roll over vent valve is not essential in a diesel system and a cap or cover may be provided in place of the roll over vent valve.

The connector can fixedly or pivotally mount the support arm assembly in the fuel tank. The pivotal mounting of the support arm can reduce the operational loads on the components in the fuel tank and/or an access aperture(s). The fuel tank may flex during vehicle operation and in certain cases this flexing may be accommodated by the pivoting movement of the support arm assembly.

The connector can be adapted to be mounted on a bracket attached to a sidewall of the fuel tank. The bracket may comprise coupling means for pivotally mounting the arm. The connecter can comprise a first bearing surface for cooperating with the mounting bracket. The first bearing surface may be at least partially cylindrical or spherical. A complementary bearing surface can be defined on the mounting bracket. The present invention also relates to the support arm assembly described herein in combination with the mounting bracket.

The support arm assembly could be supported in a predetermined orientation. One or more stops could be provided to limit movement of the support arm assembly. Alternatively, a biasing member may be provided to bias the arm to a predetermined orientation. The biasing member may be adapted to bias the support arm assembly against a roof of the fuel tank. The biasing member may extend from the arm for engagement with a sidewall of the fuel tank. In use, the biasing member may contact an inside of the fuel tank. For example, the biasing member could contact a sidewall, a floor, or a roof of the fuel tank. A detent or recess may be formed in the fuel tank to receive the biasing member. The biasing member can be a support foot on which the arm rests under normal operating conditions.

The biasing member could comprise a spring-biased mechanism. Alternatively, the biasing member could be formed from a resilient material. The biasing member could be formed integrally with the cross over arm. However, the biasing member could be formed separately and then attached to the cross over arm. This latter approach allows the operating characteristics of the support arm assembly to be tailored for particular applications. For example, the dimensions (such as height) and material properties (such as resilience) of the biasing member can be varied for different applications. The biasing member could be permanently or releasably mounted on the cross over arm.

The support arm assembly may further comprise a fuel level sender unit having a sender arm float. The fuel level sender unit may be permanently or releasably mounted on the arm.

A support arm assembly may comprise a guide member for the fuel transfer tube. The guide member can be connected to a distal end of the fuel transfer tube. In use, the guide member may bias the fuel transfer tube away from the sender arm float. The guide member may thereby reduce the risk of the fuel transfer tube becoming entangled with the sender arm float.

At least one breather port can be provided on the arm. The breather port can be placed in fluid communication with the fill limiter vent valve and/or the roll over vent valve. The at least one breather port can be formed integrally with the support arm. A breather tube can be connected to the breather port. For a petrol system, the breather tube can connect the fill limiter vent valve and/or the roll over vent valve to a vapour canister (such as a charcoal canister). For a diesel system, the breather tube can connect the interior of the fuel tank to a filler cap. The support arm assembly may be adapted to maintain the breather tube in a substantially horizontal position in use. This horizontal arrangement may help to prevent the formation of troughs in the breather tube where fuel may collect.

The connector may enable the support arm assembly to pivot about a first axis and optionally a second axis. The connector can comprise a sleeve, a barrel, a socket, a pin, a mounting bush or any other joint suitable for providing a pivoting connection. In one embodiment, the connector comprises a cylindrical barrel for location in a complementary sleeve.

The support arm assembly may comprise a latching mechanism to temporarily secure the arm. A latching mechanism could be provided on the arm and/or the connector. The latching mechanism can comprise a recess for receiving a latch provided on the bracket; or a latch locatable in a recess formed in the bracket.

The support arm assembly may comprise a locking device for securing the cross over arm in position. For example, the connector may comprise an aperture or a recess to receive a locking device operable to lock the arm in position. The locking device can comprise a latch, a ratchet, an over-centre lever or other locking mechanism. The locking device could comprise a mechanical fastener, such as a screw. For example, the mechanical fastener may locate in a slot formed in the connector.

The arm may comprise a chamber for collecting debris formed when the support arm is coupled to the mounting bracket. The chamber can be formed in the connector.

To facilitate maintenance, the locking device may be unlocked to allow the support arm assembly to be released. In some embodiments, the locking device may be locked and/or unlocked when the support arm assembly is located in the fuel tank (i.e. in situ).

The support arm assembly may comprise one or more stop members for limiting the pivotal movement of the support arm in a first direction and/or a second direction. The stop member(s) could be one or more protuberances provided on the arm connector.

According to a further aspect of the present invention there is provided a fuel tank having a support arm assembly as described herein mounted therein. The support arm assembly can be pivotally mounted on a bracket fixedly attached to a sidewall of the fuel tank. The bracket can be provided remote from an access aperture formed in the fuel tank. The bracket may be welded or bonded (for example, friction welded) to a sidewall of the fuel tank.

According to another aspect of the present invention there is provided a bracket for mounting a support arm assembly of the kind described above, the bracket comprising:
- a base portion mountable on an inner surface of a fuel tank;
- coupling means for pivotally coupling the support arm to the bracket to enable the support arm to pivot about a first axis; and
- a locking device to secure the support arm in said coupling means, the locking device comprising a guide channel for receiving a fastener to lock the support arm in said coupling means.

Within the scope of this application it is envisaged that the various aspects, embodiments, examples, features and alternatives set out in the preceding paragraphs, in the claims and/or in the following description and drawings may be taken independently or in any combination thereof. For example, features described in connection with one embodiment are applicable to all embodiments, unless there is incompatibility of features.

BRIEF DESCRIPTION OF THE DRAWINGS

The present invention will now be described, by way of example only, with reference to the accompanying figures, in which:

FIGS. 2A and 2B show first and second perspective views of the cross over arm according to an embodiment of the present invention;

FIG. 3 shows a sectioned view of the mounting bracket and support arm according to an embodiment of the present invention;

FIGS. 7A and 7B show a cross-sectional view and a perspective view of an insert for a diesel fuel system; and FIG. 8 shows the insert of FIGS. 7A and 7B installed in the collar shroud.

DETAILED DESCRIPTION

Figure 1:
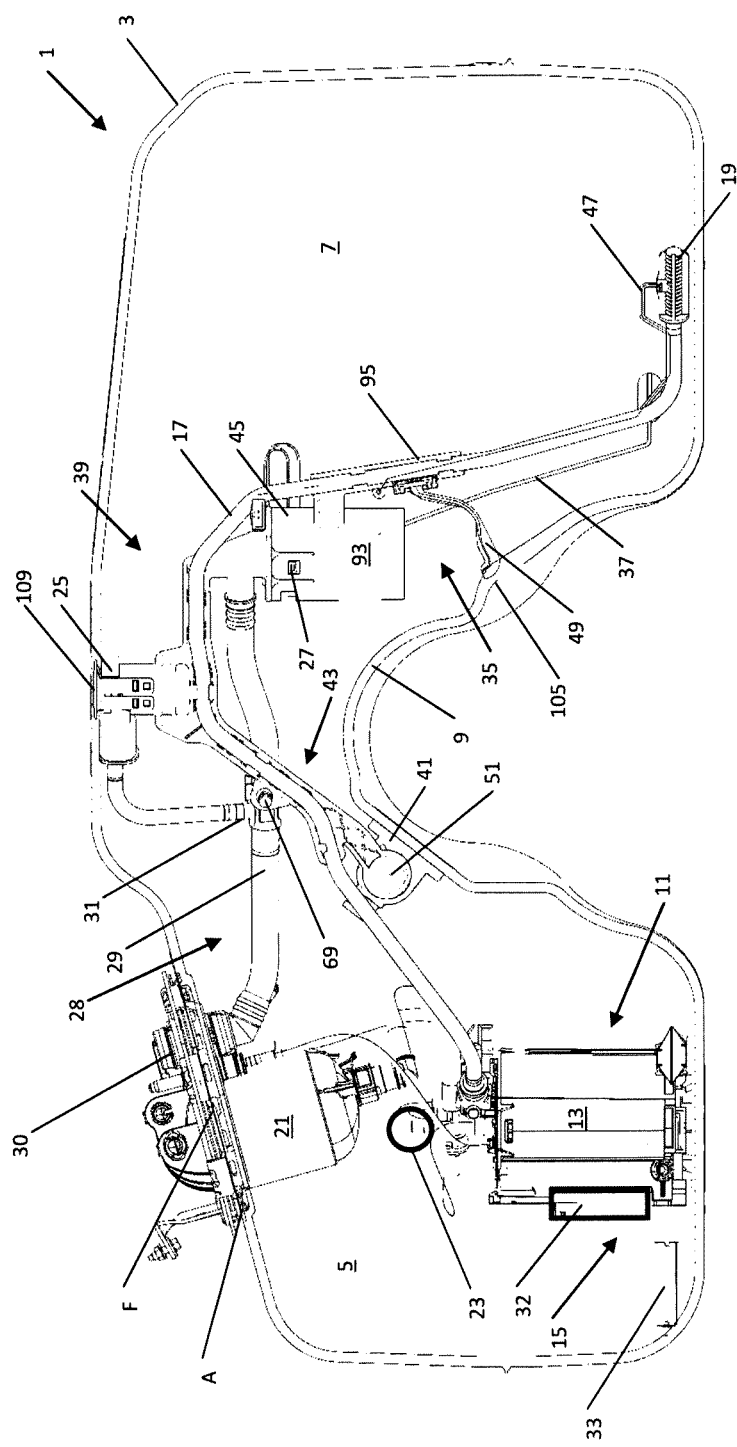
FIG. 1 shows a cross-sectional view of a fuel tank assembly embodying an embodiment of the mounting bracket and support arm according to the present invention.

The present invention relates generally to a fuel tank 1 for an automotive vehicle (not shown for clarity). A cross-section of the fuel tank 1 according to an embodiment is shown in FIG. 1.

A single chamber saddle-type fuel tank 1 is illustrated but the embodiments of the present invention described herein may find application with other types of fuel tank such as those having internal baffle plates. Furthermore, the illustrated fuel tank 1 could contain petrol (gasoline), diesel, bio-diesel, alcohol, and liquids other than those intended to act as fuels, such as fuel additives such as urea based solutions. For the sake of clarity, the present invention will be described with reference to petrol in the first instance.

The fuel tank 1 comprises a one-piece carcass 3 formed by extrusion blow-moulding using conventional techniques. The fuel tank 1 comprises a first (active) chamber 5 and a second (passive) chamber 7. A saddle 9 is formed between the first and second chambers 5, 7 but they remain in communication with each other. A fuel delivery module (FDM) 11 comprising an integrated fuel pump 13 and a first fuel level sender unit 15 is provided in the first chamber 5. A fuel transfer tube 17 (having a filter 19 at its distal end) is provided to enable fuel to be drawn from the second chamber 7 by the fuel pump 13. The fuel delivery module 11 also incorporates a filter module 21 mounted in a flange F sealingly located in an access aperture A formed in the carcass 3.

The fuel tank 1 further comprises an inlet check valve (ICV) 23, a roll over valve (ROV) 25 and a fill limit vent valve (FLVV) 27. The roll over valve 25 and the fill limit vent valve 27 are generally open and allow ventilation of the fuel tank 1. A breather line assembly 28 comprising a breather conduit 29 connects the fill limit vent valve 27 to a breather vent 30. The breather vent 30 is connected to a vapour canister, such as a charcoal canister (not shown), for the collection and discharge of fuel vapour into an engine inlet manifold (not shown) during operation. The roll over valve 25 is connected to the breather conduit 29 by a T-connector 31. The roll over valve 25 closes if the fuel tank 1 is inverted to prevent fuel escaping through the breather vent 30. The fill limit vent valve 27 closes when the level of the fuel in the fuel tank 1 reaches a maximum fill height. In alternate embodiments, the roll over valve 25 may be kept separate from the breather line assembly by connecting it to another port on the flange F of the fuel delivery module 11.

The first fuel level sender unit 15 comprises a first gauge module 32 and a first sender arm float 33 which pivots in response to changes in the level of the fuel in the first chamber 5. A second fuel level sender unit 35 is provided for monitoring the level of the fuel in the second chamber 7. The second fuel level sender unit 35 comprises a second gauge module (not shown) and a second sender arm float 37 which pivots in response to changes in the level of the fuel in the second chamber 7.

A support arm assembly 39 is provided to support the second fuel level sender unit 35 along with the roll over valve 25 and the fill limit vent valve 27. The support arm assembly 39 is pivotally mounted on a bracket 41 (described below) fixedly attached to an inside wall of the carcass 3. The support arm assembly 39 has a modular construction and comprises an arm, (also referred to as a cross over arm) 43, a collar shroud 45 (which at least partially surrounds the fill limit vent valve 27), a transfer tube support member 47 and a resilient support foot 49.

As shown in FIGS. 2A and 2B, the cross over arm 43 is a one-piece moulding comprising a cylindrical mounting barrel 51, a first valve housing 53 and a second valve housing 55.

The barrel 51 is provided at a proximal end of the cross over arm 43 to pivotally mount the support arm assembly 39 in the mounting bracket 41. The barrel 51 has a longitudinal axis X (extending perpendicular to the plane of the page in FIG. 1 and shown in FIG. 4) about which the cross over arm 43 can pivot. A first end 57 of the barrel 51 has a tapered or rounded profile to facilitate location of the barrel 51 in the bracket 41. A resilient latching member 59 is provided on the barrel 51 to engage the bracket 41. An elongated slot 61 is formed in the barrel 51 to receive a locking screw 52, or other mechanical fastener, to lock the cross over arm 43 in the bracket 41. A collection chamber 63 is formed in the barrel 51 (see FIG. 3).

The cross over arm 43 has a series of transfer tube clips 65 provided along a first guide channel 67 to retain the fuel transfer tube 17. A breather line clip 69 (shown in FIG. 1) is mounted on a flange 70 provided on the cross over arm 43 to support the breather line assembly 28.

The first valve housing 53 is located at the top of the cross over arm 43 to house the roll over valve 25. The second valve housing 55 is provided at the distal end of the cross over arm 43 to house the fill limit vent valve 27. A first port 71 for connection to the breather conduit 29 is moulded in the cross over arm 43 proximal the second valve housing 55. The first port 71 is in fluid communication with the second valve housing 55 to connect the fill limit vent valve 27 with the breather vent 30. A second port could optionally be provided for connection to the roll over valve 25 in place of the T-connector 31. As noted above, the roll over valve 25 and the fill limit vent valve 27 may have separate connections to the flange 22 of the fuel delivery module 11.

Figure 4:
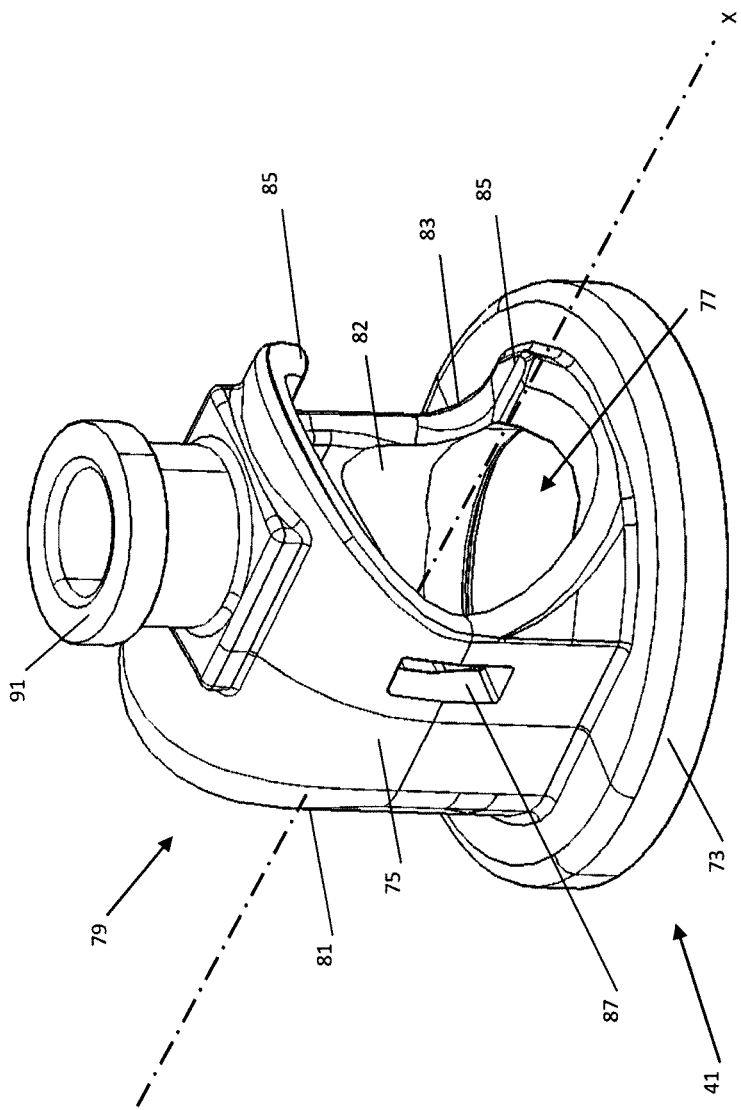
FIG. 4 shows a perspective view of the mounting bracket.

As shown in FIG. 4, the bracket 41 is a one-piece moulding comprising a base plate 73 and a mounting sleeve 75. The base plate 73 is adapted to be permanently attached to the sidewall of the carcass 3. In the present embodiment, the base plate 73 is hot plate welded to the saddle 9 of the fuel tank.

As shown in FIG. 4, the sleeve 75 is open at a first end 77 to allow the insertion of the barrel 51. A second end 79 of the sleeve 75 is closed by an end wall 81 profiled to match the first end 57 of the barrel 51. The sleeve 75 has an internal cylindrical bearing surface 82 which matches the outer surface of the barrel 51. The sleeve 75 thereby forms a socket to pivotally mount the support arm assembly 39.

The first end 77 of the sleeve 75 defines a collar 83 for limiting the pivoting motion of the cross over arm 43. As shown in FIG. 4, two protuberances 85 formed on the collar 83 define stops to limit angular rotation about the longitudinal axis X.

A slot 87 is formed in the sleeve 75 to receive the resilient latching member 59 when the barrel 51 is introduced into the sleeve 75. To secure the barrel 51 in the sleeve 75 the locking screw 52 is introduced through an aperture 89 in the bracket 41. A guide 91 (shown in FIG. 3), comprising a radially projecting boss having an axial bore formed therethrough, is optionally formed on an outer surface of the bracket 41 to support the locking screw 52 (shown in section in FIG. 3) as it is screwed into the bracket 41. The locking screw 52 locates in the elongated slot 61 in the elongate barrel 51 to enable rotation of the support arm assembly 39 about the longitudinal axis X. The locking screw 52 can abut each end of the elongated slot 61 to limit the pivoting motion of the cross over arm 43. Alternatively, the width of the elongated slot 61 relative to diameter of the locking screw 52 may be such that, when the screw 52 is tightened, the locking screw 52 'bites' into the adjacent edges of the slot 61 thereby restricting rotation of the barrel 51 within the sleeve 75. The locking screw 52 may be captive within the bracket 41 to facilitate installation.

In the present embodiment, the locking screw 52 is a thread-cutting screw. As the locking screw 52 is introduced into the bracket 41, swarf may be created as a screw thread is cut into the bracket 41. This swarf collects in the chamber 63 in the barrel 51 and is trapped therein since the chamber 63 is closed by the end wall 81 of the sleeve 75, as shown in FIG. 3. The swarf is thereby prevented from entering the body of the fuel tank 1.

Figure 5:
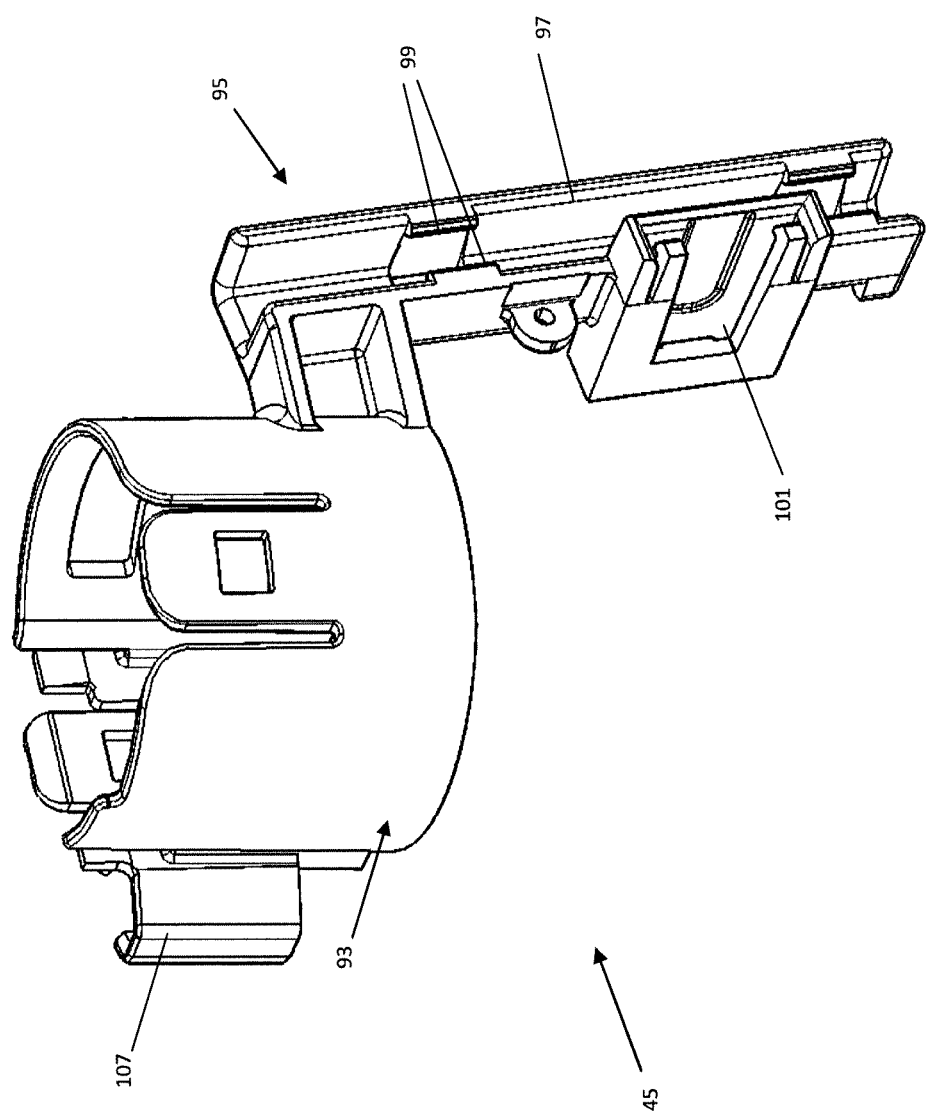
FIG. 5 shows a perspective view of the collar shroud mounted on the cross over arm of an embodiment of the present invention.

As shown in FIG. 5, the collar shroud 45 comprises a shroud 93 and a guide member 95. The shroud 93 locates over the second valve housing 55 to mount the collar shroud 45 on the distal end of the cross over arm 43. The fill limit vent valve 27 is housed within the shroud 93.

A second guide channel 97 is formed in the guide member 95 and the fuel transfer tube 17 is secured in the second guide channel 97 by a set of transfer tube clips 99. The support member 47 is a resilient wire member which extends from the guide member 95 and is attached to the filter 19. The support member 47 and the guide member 95 position the end of the fuel transfer tube 17 at the bottom of the second chamber 7 of the fuel tank 1.

Figure 6:
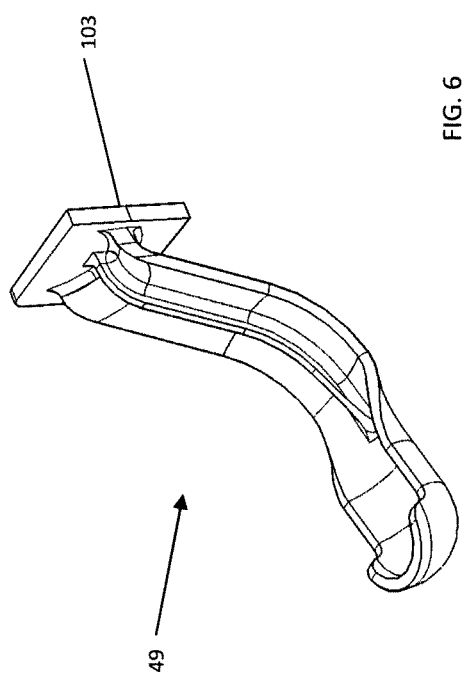
FIG. 6 shows a perspective view of a resilient foot for supporting the cross over arm of an embodiment of the present invention.

A perspective view of the support foot 49 is shown in FIG. 6. The guide member 95 has a first clip fastener 101 for receiving a retaining plate 103 to releasably mount the support foot 49. The support foot 49 is moulded from a resilient plastics material and locates in a cooperating formation or detent 105 formed in the sidewall of the carcass 3. In use, the support foot 49 biases the support arm assembly 39 to a predetermined orientation within the fuel tank 1. The support foot 49 sets the height of the fill limit vent valve 27 and, therefore, the effective volume of the fuel tank 1.

The support foot 49 could be formed integrally with the guide member 95. However, by mounting the support foot 49 in the first clip fastener 101 a modular design can be implemented to allow the support arm assembly 39 to be tailored to suit different applications. For example, by changing the dimensions of the support foot 49, the height of the fill limit vent valve 27 within the fuel tank 1 can be altered.

The second gauge module of the second fuel level sender unit 35 is removably mounted on the side of the collar shroud 45 by a second clip fastener 107. It will be appreciated that the second fuel level sender unit 35 could be integrated into the collar shroud 45 and/or the cross over arm 43.

The assembly of the support arm assembly 39 and its installation in the fuel tank 1 will now be described. The carcass 3 is formed using conventional techniques and the aperture A is cut in a sidewall. Using the aperture A for access, the bracket 41 is hot plate welded directly onto an inside wall of the carcass 3. The bracket 41 in the present embodiment is attached to the saddle 9 and faces the aperture A to provide improved accessibility. Thus, the bracket 41 is mounted remote from the aperture A and the operational loads around the aperture A and applied to the flange F may be reduced.

The support arm assembly 39 is assembled by mounting the roll over valve 25 and the fill limit vent valve 27 on the cross over arm 43. The collar shroud 45 is then positioned around the fill limit vent valve 27; and the second fuel level sender unit 35 (along with the second sender arm float 37) is mounted on the collar shroud 45. The support foot 49 is attached to the guide member 95 by the first clip fastener 101.

The fuel transfer tube 17 is inserted into the first and second guide channels 67, 97 formed in the cross over arm 53 and the guide member 95 respectively. The transfer tube clips 65, 99 retain the fuel transfer tube 17 in position. The breather conduit 29 is attached to the first port 71 and mounted on the cross over arm 43 by the breather line clip 69. The roll over valve 25 is connected to the breather conduit 29 via the T-connector 31.

The support arm assembly 39 is U-shaped so as to extend over the saddle 9 when positioned in the fuel tank 1. The assembled support arm assembly 39 can be inserted through the aperture A and installed in the fuel tank 1 without deforming the cross over arm 43 or the guide member 95. Thus, the support arm assembly 39 can have a fixed geometry.

The support arm assembly 39 is positioned in the fuel tank 1 such that the second fuel level sender unit 35 and the distal end of the fuel transfer tube 17 are disposed in the second chamber 7. By supporting the fuel transfer tube 17 along its length, the support member 47 and the guide member 95 help to prevent entanglement with the second sender arm float 37 which might obstruct or prevent movement of the second arm float 37.

The roll over valve 25 is positioned at the top of the fuel tank 1. A cap 109 may optionally be provided on the roll over valve 25 to contact the roof of the fuel tank 1. The second fuel level sender unit 35 and the collar shroud 45 are located in the second chamber 7. The support foot 49 is then located in the detent 105 formed in the sidewall of the saddle 9 and the barrel 51 inserted into the mounting bracket 41. The latching member 59 on the barrel 51 locates in the slot 87 in the bracket 41 to temporarily secure the cross over arm 53. In the example shown in the Figures, the latching member 59 is arranged to secure the arm assembly by means of a snap-fit configured to provide an audible and/or tactile indication to the assembly operator that the support arm assembly 39 is properly located. The locking screw 52 is then screwed into the aperture 89 in the bracket 41 to secure the support arm assembly 39. The fuel delivery module 11 and the filter module 21 are then installed and the assembly of the fuel tank 1 completed in conventional manner.

As outlined above, the support arm assembly 39 can rotate about the longitudinal axis X. In use, the carcass 3 may flex due to external loading, for example if the vehicle in which the fuel tank 1 is installed travels over rough terrain. The pivotal coupling between the bracket 41 and the support arm assembly 39 can accommodate any such flexing of the fuel tank 1. Moreover, any loads applied to the fuel tank 1 are not transferred directly to the mounting block 41 since the support arm assembly 39 can pivot within the fuel tank 1. This arrangement can enhance durability and reliability of the fuel tank assembly in use. Alternatively, in the case that the locking screw 52 acts to hinder or substantially prevent rotation of the barrel 51 within the sleeve 75, flexing of carcass 3 of the fuel tank 1 may be accommodated by flexing of the cross over arm 53 itself. In this case, although forces may be transferred to the mounting block 41, the fact that the mounting block 41 is remote from flange F of the access aperture A, means that any such forces do not have an adverse effect on the integrity of the seal around the filter module 21.

The support foot 49 biases the support arm assembly 39 towards a predetermined position/orientation within the fuel tank 1. Thus, movement of the fuel tank 1 does not affect the supply of fuel from the fuel tank 3 since the fuel transfer tube 17 remains in substantially the same position. The support foot 49 also helps ensure that the second fuel level sender unit 35 remains at a predetermined height within the fuel tank 1. The support foot 49 may bias the roll over valve 25 against the roof of the fuel tank 1.

The breather line clip 69 supports the breather conduit 29 in a substantially horizontal position. This helps prevent the formation of troughs (so-called U-traps) in the breather conduit 29 where fuel may collect resulting in premature cut-off when the fuel tank 3 is being filled.

The fuel tank 1 has been described with particular reference to petrol (gasoline). It will be appreciated that modifications could be made to render the fuel tank 1 suitable for diesel fuel, alcohol, or a liquid not intended to act as a fuel, for example a fuel additive such as an urea solution. The equivalent diesel fuel tank 1 would incorporate a diesel delivery module (DDM) in place of the fuel delivery module 11. Also, the fuel tank 1 would be vented to the fuel filler cap (not shown) rather than a charcoal canister or the like. Accordingly, the roll over valve 25 can be omitted for diesel applications and a cap 109 provided to contact the roof of the fuel tank 1.

A further optional modification for diesel systems would be to omit the fill limit vent valve 27. Instead, the fill limit of the fuel tank 1 would be controlled by a tubular insert 111 located inside the shroud 93 to replace the fill limit vent valve 27. As shown in FIGS. 7A and 7B, an inclined opening 113 is formed at the bottom of the insert 111 to place the interior of the fuel tank 1 in communication with the breather vent 30 via the breather conduit 29. The top of the insert 111 locates inside the second casing 55 and a circumferential flange 115 abuts the top of the second casing 55. An O-ring 117 is provided around the top of the insert 111 to form a seal with the breather line assembly 28. An external collar 119 is formed on the insert 111 and a pair of latching members 121 cooperates with complementary slots (not shown) in the shroud 93 to secure the insert 111.

A cross-sectional view of the insert 111 installed in the collar shroud 45 of the support arm assembly 39 is shown in FIG. 8. In use, when the fuel within the fuel tank 1 covers the opening 113, the air above the fuel in the carcass 3 can no longer vent through the breather vent 30. The carcass 3 is thereby effectively sealed and the continued supply of fuel causes an increase in pressure within the fuel tank 1. The increased pressure causes the fuel dispenser to cut off and the supply of fuel to the fuel tank 1 to be stopped. The closure of the opening 113 in the insert 111 by the fuel in the fuel tank 1 is thereby equivalent to the closing of the fill limit vent valve 27. It will be appreciated that the height of the opening 113 in the fuel tank 1 determines the fill limit.

A similar result may be achieved without providing a tubular insert 111. Instead, the shroud 93 can by extended downwardly to the desired height within the fuel tank 1. Once the fuel within the fuel tank 1 covers the bottom of the shroud 93 the breather line assembly 28 is closed and the fuel tank 1 is effectively sealed. The resulting increase in pressures causes the fuel dispenser to cut off and thereby limit supply of fuel to the fuel tank 1. These modifications are believed to be independently patentable and are the subject of a co-pending application.

It will be appreciated that various changes and modifications may be made without departing from the scope of the present invention. For example, the roll over vent 25 and the fill limit vent valve 27 could be over moulded into the support arm assembly 39. Likewise, the fuel transfer tube 17 could be integrally formed in the support arm assembly 39, for example using gas-assisted moulding.

The invention claimed is:

1. A support arm assembly for mounting in a fuel tank, the support arm assembly comprising:
   an arm having a connector for mounting the support arm assembly;
   a fuel fill limiter mounted on the arm;
   a biasing member that spring biases the support arm assembly to unattachably abut a roof of the fuel tank; and
   wherein the support arm assembly is shaped so that when the support arm assembly is mounted in the fuel tank, the support arm assembly extends from a first chamber of the fuel tank, over a saddle arch of the fuel tank, into a second chamber of the fuel tank.

2. A support arm assembly as claimed in claim 1 comprising a fuel transfer tube for connection to a fuel pump.

3. A support arm assembly as claimed in claim 2, comprising:
   a fuel level sender unit having a sender arm float, wherein the fuel level sender unit is mounted on the arm; and
   a guide member connected to a distal end of the fuel transfer tube, wherein the guide member biases the fuel transfer tube away from the sender arm float.

4. A support arm assembly as claimed in claim 1, wherein said fuel fill limiter comprises a fuel fill limit vent valve.

5. A support arm assembly as claimed in claim 1, wherein the fuel fill limiter comprises a hollow member in fluid communication with a breather vent, an opening being provided in said hollow member to place the breather vent in fluid communication with an interior of the fuel tank.

6. A support arm assembly as claimed in claim 5, wherein said opening is formed in a lower region of the hollow member, or in a base of the hollow member.

7. A support arm assembly as claimed in claim 5, wherein the hollow member is a tubular member, the tubular member extending substantially vertically within the fuel tank, in use.

8. A support arm assembly as claimed in claim 1 comprising a roll over vent valve mounted on the arm.

9. A support arm assembly as claimed in claim 1, wherein the support arm assembly is generally U-shaped and has a fixed geometry.

10. A support arm assembly as claimed in claim 1 further comprising a fuel level sender unit having a sender arm float, wherein the fuel level sender unit is mounted on the arm.

11. A support arm assembly as claimed in claim 1, wherein at least one breather port is provided on the arm.

12. A support arm assembly as claimed in claim 11 comprising a breather conduit connected to the breather port; wherein, in use, the support arm assembly supports the breather conduit in a substantially horizontal position.

13. A support arm assembly as claimed in claim 1, wherein a chamber is formed in said connector for collecting debris.

14. A support arm assembly as claimed in claim 1 further comprising a locking device for securing the support arm assembly in position.

15. A support arm assembly as claimed in claim 1, wherein the biasing member is configured to abut the fuel tank.

16. A support arm assembly as claimed in claim 1, wherein the biasing member comprises a support foot that has one end supported on an inside surface of the fuel tank and a second end engaging the support arm assembly.

17. A support arm assembly as claimed in claim 1, wherein the support arm assembly is moveable relative to the roof of the fuel tank while the support arm assembly is in a position wherein at least a portion of the support arm assembly abuts the roof of the fuel tank.

18. A support arm assembly as claimed in claim 1, wherein the support arm assembly is mounted in the fuel tank, using the connector, at a first location in the first chamber, the first location being on a sidewall of the saddle arch in the first chamber and is opposite an opening in the fuel tank;
   wherein the biasing member abuts the fuel tank at a second location, the second location being on a sidewall of the saddle arch in the second chamber; and
   wherein the support arm assembly abuts the roof of the fuel tank at a third location, separated from the saddle arch.

19. A fuel tank assembly, comprising
   a fuel tank comprising a first chamber, a second chamber and a saddle arch between the first chamber and the second chamber;
   a support arm assembly mounted in the fuel tank, the support arm assembly comprising:
     an arm having a connector for mounting the support arm assembly;
     a fuel fill limiter mounted on the arm;
     a biasing member that spring biases the support arm assembly to unattachably abut against a roof of the fuel tank;
     wherein the support arm assembly is shaped to extend from the first chamber, over the saddle arch, into the second chamber.

20. The fuel tank assembly of claim 19, wherein the biasing member comprises a resilient support foot that has one end supported on an inside surface of the fuel tank and a second end engaging the support arm assembly.

21. A vehicle, comprising:
   a fuel tank comprising a first chamber, a second chamber and a saddle arch between the first chamber and the second chamber; and
   a support arm assembly in the fuel tank, the support arm assembly including:
     an arm having a connector for mounting the support arm assembly in the fuel tank;
     a fuel limiter supported on the arm;
     a biasing member that biases the support arm assembly to unattachably abut an upper surface of the fuel tank;
     wherein the support arm assembly is shaped to extend from the first chamber, over the saddle arch, into the second chamber.

22. The vehicle of claim 21, wherein the biasing member comprises a resilient support foot that has one end supported on an inside surface of the fuel tank and a second end engaging the support arm assembly.

\* \* \* \* \*